United States Patent Office 3,478,012
Patented Nov. 11, 1969

3,478,012
LEVOGLUCOSAN PRODUCTION BY PYROLYSIS
OF PRETREATED STARCHES
Ivan A. Wolff and David W. Olds, Peoria, Ill., assignors to the United States of America as represented by the Secretary of Agriculture
No Drawing. Filed Mar. 21, 1968, Ser. No. 714,802
Int. Cl. C08b 25/02
U.S. Cl. 260—209
1 Claim

ABSTRACT OF THE DISCLOSURE

Yields of levoglucosan from the pyrolysis of dried waxy corn starch, arrowroot starch, or tapioca starch are greatly increased where the waxy starch first has been treated with an $SO_2$ steep and where the arrowroot or tapioca starches has been steeped in a dilute solution of a calcium salt such as calcium chloride or calcium acetate. The treatments are beneficial only when applied to the specific starch species, and ordinary pearl corn starch is unaffected.

BACKGROUND OF THE INVENTION

This invention relates to the discovery that the yields of levoglucosan from the pyrolysis of specific starches are strikingly increased by prior exposure of the starch to a sulfur dioxide steep in the case of waxy corn starch and to either calcium chloride or calcium acetate solution in the case of arrowroot starch or tapioca starch.

Levoglucosan, i.e., 1,6 - anhydro-$\beta$-D-glucopyranose, was obtained fully a half century ago by the destructive distillation of starch, Pictet et al., Helv. Chim. Acta 1:78 (1918). Levoglucosan has known utility for the synthesis of other carbohydrates including dextrin like polymers and as a research tool for determining the configuration of anomeric glucosides. The continuing industrial interest in levoglucosan (hereinafter optionally termed "LG") is indicated by the existence of recently issued Carlson patent, U.S. Patent No. 3,235,541, wherein wood pulp is pyrolyized in the presence of superheated steam rather than essentially under vacuum. Although Coleman et al., Ind. Eng. Chem. 36:1040 (1944) discussed the potential commercial value of LG a quarter of a century ago, the virtual absence of commercial sources thereof suggests that its cost may be responsible for the presently limited market.

Accordingly, the principal object of the instant invention is the provision of an improved process whereby herein enunciated and surprisingly species specific and critical pretreatments of certain starches unobviously markedly improves and in some cases almost doubles the yield of LG in a subsequent otherwise conventional pyrolysis of the so treated specific species, wherein the pretreatment comprises stirring the arrowroot or tapioca members for at least from 10 minutes to several hours in a 4-percent aqueous solution of a calcium salt such as the chloride or acetate. Waxy corn starch is not benefited by pretreatment with a calcium salt, but distinctly improved yields of LG, i.e., increases of ca. 35 percent, are found to be provided by a pretreatment comprising steeping the waxy starch in an aqueous $SO_2$ solution wherein the concentration of dissolved $SO_2$ is not less than about 0.07 percent until the waxy starch acquires a sulfur dioxide content of about 0.02 percent. Obviously the treated starches are then extensively dried before subjecting the suitably treated species to pyrolysis. Thus, via greatly increased yields, the improved process of the instant invention may directly lower the cost of producing levoglucosan from starches and thereby pave the way for significant industrial employments.

Another and more specific object of our invention is the provision of a process whereby low yielding waxy corn starches are enabled to provide levoglucosan yields comparable to or exceeding the 32 percent yields obtained with ordinary, i.e., non-waxy, pearl corn starch.

The above stated objects of the invention will be more fully appreciated in the light of the following illustrative embodiments.

EXAMPLE 1

Commercially obtained arrowroot starch, 150 grams, was suspended in 2 liters of 4-percent calcium acetate solution (pH ca. 8.5) and stirred for 10 minutes. After separation on a Buchner funnel, the cake was washed 6–8 times with distilled water, and then dried first for 2 hours at 50° C. in a convection oven and then for 24 hours at 110° C. in a laboratory oven to a moisture content of 1.5–2.5 percent. The resulting lumps fractured readily into long needlelike pieces or "crystals" that avoided the tendency of finely divided starch to be carried into the receiver during evacuation of the system or during the early stages of the heating period, but since this aspect relates only to increasing the reliability of the analyses and recoveries, it is not considered a part of the invention.

Fifty grams of the so prepared starch "crystals" were placed in a 1-liter round-buttomed Pyrex flask having a side-arm delivery tube and an electrical heating mantle enclosing the neck of the flask, which neck was fitted with a rubber-stoppered tube leading to a manometer. A 200-ml. filter flask acting as receiver acting as receiver was connected on one side to the delivery arm and on the other side, through a Dry Ice trap, to a vacuum pump. The system was evacuated to a pressure of 1 mm. Hg, and the electric mantle was heated to 390° C. in 8–10 minutes and then was maintained at that level through the 30 minutes immediately succeeding the ca. 20 minutes of actual distillation.

The distillate in the receiver became viscous on cooling, and acetone 1.5 ml. per gram of syrupy distillate was added. The mixture was warmed to about 55° C. on a steam bath to dissolve the sirup. Crystallization of the LG began and was essentially completed overnight in the refrigerator. The crude LG was filtered on a Buchner funnel, washed with a small amount of cold acetone, and dried in a vacuum desiccator. The yield of pure LG based on the optical rotation value of the crude LG in water was 38 percent of theory, but this yield is apparent and minimal since it does not account for the fact that the crude LG contains a small amount of oppositely polarizing isomer that lowers the levorotation of the crude and also that some LG remains in the mother liquor upon acetone precipitation and is thus neglected in calculating the yield. Comparisons of optical rotation-based yields with actual yields determined from benzoylations of the total pyrolysis distillate showed that the former averaged 9 percent lower than the actual.

The optical rotation value for the crude obtained by identically pyrolyzing arrowroot starch that was not subjected to the calcium acetate treatment showed the apparent yield to be only 19 percent of theory.

EXAMPLE 2

Example 1 was repeated excepting that a 0.4 percent $CaCl_2$ solution was substituted for the acetate solution. The apparent yield of LG was 36 percent of theory.

EXAMPLE 3

Example 2 was repeated excepting that commercial tapioca starch was substituted for the arrowroot starch. The apparent yield of LG from the $CaCl_2$ treated starch was 36 percent as compared with only 19 percent using the untreated tapioca as control.

However, when this example was repeated excepting that the treating solution was NaCl, the apparent yield of LG was only 19 percent, thus showing that the benefit in yield was not due simply to any salt but specifically to a calcium ion effect.

EXAMPLE 4

Waxy corn starch (Iowa 939) was suspended in water containing 0.22 percent $SO_2$, from which steeping liquid the starch acquired an $SO_2$ content at ca. 0.02 percent. After washing and drying the treated starch, it was pyrolized as previously described. The apparent yield of pure LG was 41 percent as compared with only 23 percent for a control that was steeped in water alone.

Another experiment in which ordinary pearl cornstarch (Illinois 972 hybrid) was substituted for the waxy starch; on pyrolysis it gave an apparent LG yield of 29 percent, which was identical with that obtained from the control, i.e., the same starch but not subjected to steeping in $SO_2$, thus showing that a sulfur dioxide treatment has no effect on ordinary corn starch.

A nonexclusive, irrevocable, royalty-free license in the invention herein described, throughout the world for all purposes of the United States Government, with the power to grant sublicenses for such purposes, is hereby granted to the Government of the United States of America.

We claim:
1. In the process for obtaining levoglucosan by the pyrolysis of a dried starch member selected from the group consisting of arrowroot starch, tapioca starch, and waxy corn starch the improvement comprising pretreating the first and second named members of said group by suspending said first and second members for at least 10 minutes in an aqueous 4 percent solution of a salt selected from the group consisting of calcium acetate and calcium chloride, and pretreating the third named member by steeping said member in water containing about 0.2 percent of dissolved $SO_2$ until the $SO_2$ content of the member reaches a level of about 0.02 percent, and then drying the thusly pretreated members so that they can be subjected to pyrolysis.

References Cited

UNITED STATES PATENTS

| 3,298,928 | 1/1967 | Esterer | 260—209 |
| 3,309,355 | 3/1967 | Heritage et al. | 260—209 |
| 3,374,222 | 3/1968 | Peniston | 260—209 |

LEWIS GOTTS, Primary Examiner

JOHNNIE R. BROWN, Assistant Examiner